Nov. 22, 1949 — H. L. HOEPPNER — 2,488,628
MULTIPHASE POWER TRANSFORMER
Filed Oct. 12, 1946 — 2 Sheets-Sheet 1
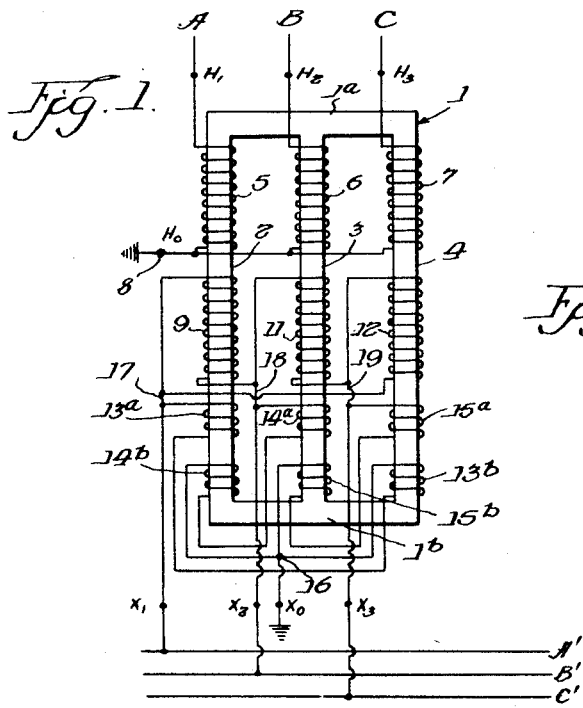
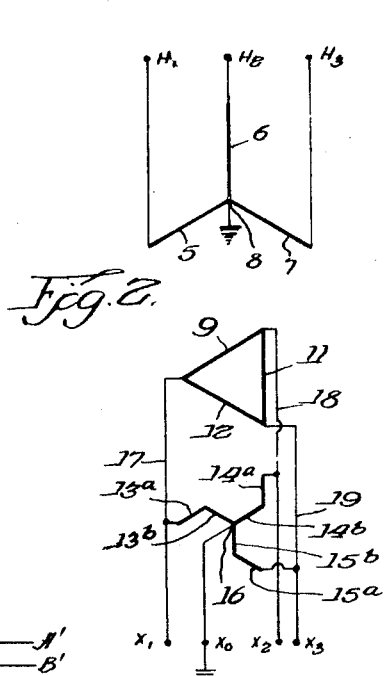
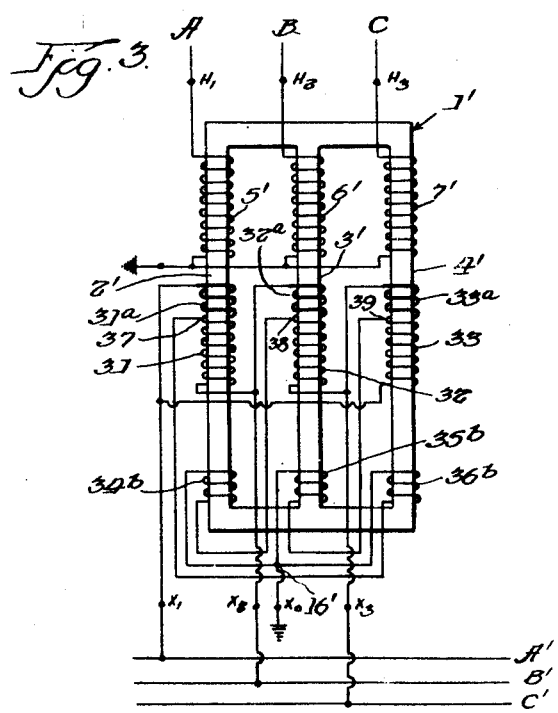
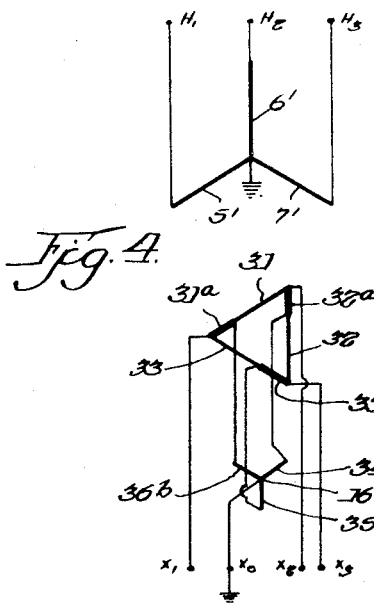
Inventor:
Henry L. Hoeppner
By [signature] Atty's

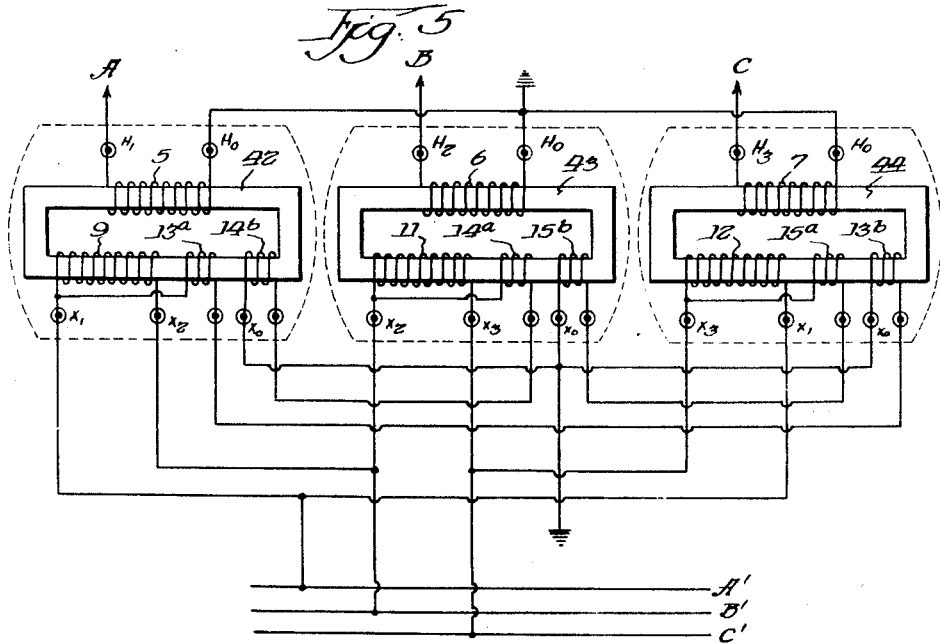
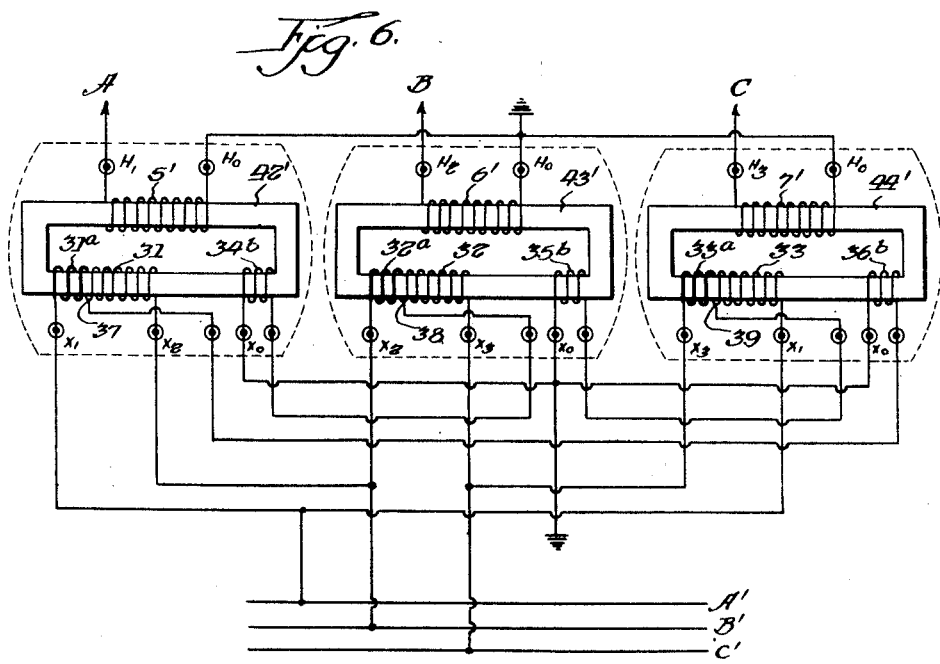

Patented Nov. 22, 1949

2,488,628

UNITED STATES PATENT OFFICE 2,488,628

MULTIPHASE POWER TRANSFORMER

Henry L. Hoeppner, Park Ridge, Ill.

Application October 12, 1946, Serial No. 702,988

11 Claims. (Cl. 171—97)

The invention relates generally to electrical transformers and particularly to transformers such as those used in connection with three phase electric power transmission and distribution.

It is well known that three phase power transformation may be effected through the use of a three phase transformer or by a group of three interconnected single phase transformers, and in a three phase transformer, or when using three single phase transformers, the windings making up the primary, the secondary, the tertiary, etc., may be Y (or star) connected, delta connected, or zig-zag (also referred to as interconnected Y, interconnected star and broken delta) connected. Likewise, it is customary to refer to a three phase transformer, or bank of single phase transformers, as Y-delta, Y-Y, delta-delta, Y-zig-zag, etc. (Y-Y-delta, Y-delta-zig-zag, etc., in the case of three winding transformers), depending on the connections adopted for the transformer or bank of three single phase transformers.

Each of these various types of connections possess certain well known inherent advantages and disadvantages, which govern their selection. Some of the factors which are normally taken into consideration in the selection of the type of connection to be employed are:

a. Grounded or ungrounded neutral.
b. Neutral stabilization.
c. Voltage stresses and current flow during line to ground faults.
d. Single phase power requirements at phase to neutral voltage.
e. Suppression or dissipation of harmonic voltages and currents.
f. Angular phase displacement between the different voltage levels in the transmission and distribution system.

Obviously, a neutral, or ground connection is not obtainable from a three phase transformer winding which is delta connected, but is readily obtainable in a system or network which is connected to or supplied from a three phase transformer winding which is Y connected or zig-zag connected.

The factors favoring a grounded neutral system are well known, consequently on those sections of an electric transmission or distribution system which are supplied by or are connected to the delta connected winding, where a system neutral is desired or is required it is now the practice to provide a separate grounding transformer. There are two types of grounding transformers, namely, the zig-zag and the Y-delta, and it will be apparent that in power installations a separate grounding transformer may cost considerably.

The present invention has among its objects the production of a transformer circuit that provides in one unit or bank, certain desirable features or characteristics of the various types of connections, which heretofore have been obtained only by using multiple units. Thus the present invention in one unit or bank provides, among others, an inherently stable neutral for a grounded neutral system, a circulating path for harmonics and a 30 degree voltage displacement between primary and secondary windings to match present Y-delta connected transformers.

Another object of the invention is the production of such a transformer or transformer bank which will require less core iron, less copper, less insulating material and fewer terminal bushings than would be required in the construction of the multiple transformers heretofore used to achieve similar results, and as the invention pertains particularly to transmission systems having transformers of considerable size and weight, the cost of which may run into thousands of dollars, a considerable saving in initial cost may be achieved. Likewise, when constructed as a single unit only one foundation and one set of connections is required. There will also be a saving in space and a general simplification of the installation.

A further object of the invention is the production of such a transformer which offers considerable latitude in its design with respect to the apportionment of the winding components, whereby various operating requirements may be achieved at very little cost.

Other objects and advantages of the construction herein shown and described will be obvious to those skilled in the art from the disclosure herein given.

To this end my invention consists in the novel construction, arrangement and combination of parts herein shown and described and more particularly pointed out in the appended claims.

In the drawings wherein like reference characters indicate like or corresponding elements:

Fig. 1 is a circuit diagram of a three phase transformer embodying the present invention;

Fig. 2 is a vector diagram of the phase relationship in the transformer circuit illustrated in Fig. 1;

Fig. 3 is a circuit diagram of a modified form of the invention illustrated in Fig. 1;

Fig. 4 is a vector diagram of the phase relationship in the transformer circuit illustrated in Fig. 3;

Fig. 5 is a circuit diagram for a transformer bank made up of three single phase transformers employing the wiring circuit illustrated in Fig. 1, and Fig. 6 is a similar circuit diagram for a transformer bank made up of three single phase transformers employing the wiring circuit illustrated in Fig. 3.

Referring to the drawings, and particularly to Fig. 1, 1 indicates generally a three phase transformer core, provided with three winding-receiving core elements 2, 3 and 4 respectively, connected at their corresponding ends by the portions 1ª and 1ᵇ. The core 1, illustrated in the present instance as of a core type, as distinguished from a shell type core, is constructed in the usual manner, consequently, the details thereof, whether of core or shell type, do not form part of the present invention.

Wound around the respective core elements 2, 3 and 4 are primary windings 5, 6 and 7, having one of their corresponding ends connected to a common point 8 in the usual Y or star connection, common in three phase transformers, the neutral point 8 in the construction illustrated being shown as grounded. The opposite ends of the primary windings 5, 6 and 7 are brought out to terminals H¹, H², and H³, respectively, adapted to be connected to the primary power line indicated by the letters A, B and C, respectively. Also wound on the core elements 5, 6 and 7 are secondary windings 9, 11 and 12, respectively, having their corresponding ends connected in closed series to form the usual delta connection. Also wound on the core element 2 is a pair of windings 13ª and 14ᵇ. Similarly, the core element 3 contains a pair of windings 14ª and 15ᵇ, and in like manner the core element 4 contains a pair of windings 15ª and 13ᵇ. Each element of these pairs contains one third of the number of turns contained in the elements of the delta winding that is, for example, winding 13ª has one third the number of turns in winding 9, to maintain proper phase relationship between the respective delta and zig-zag windings. These three pairs of windings are connected in the usual zigzag connection, wherein one end of the winding 13ª is connected to an end of the winding 13ᵇ, and in like manner the windings 14ª and 14ᵇ, 15ª and 15ᵇ are connected, the opposite ends of the windings 13ᵇ, 14ᵇ and 15ᵇ being connected together to form a common neutral point 16, the latter being brought out to a terminal X⁰. Obviously, all of the primary and secondary windings are connected as above set forth with the connections between respective windings so determined that the phase relationship there between will be as illustrated in the vector diagram shown in Fig. 2. In other words, the alternating E. M. F. in any of the respective windings of the primary approaches its cyclic maximum value at the same instance that the E. M. F. in the corresponding secondary winding reaches its cyclic maximum value, thereby resulting in the primary and secondary windings having the vector relationship illustrated in Fig. 2. It will be noted that the free end of the secondary winding 13ª is connected by a conductor 17 to the juncture of the secondary windings 9 and 12. In like manner the free end of the winding 14ª is connected by a conductor 18 to the juncture of the secondary windings 9 and 11, and the free end of the 15ª by a conductor 19 to the juncture of the windings 11 and 12, the conductors 17, 18 and 19 being brought out to the terminals X¹, X² and X³ respectively, which are adapted to be connected to the secondary lines A¹, B¹ and C¹ respectively. The neutral point 16 is brought out to the neutral terminal X⁰ of the transformer from where it may be grounded.

It will be apparent from a reference to Fig. 2 that by use of the delta connected secondary, formed by the windings 9, 11 and 12, that there will be a phase angle relationship of 30 degrees between the primary voltage and the secondary voltage, whereby a transformer constructed in accordance with the present invention may be matched with existing Y/delta transformer installations. Also, a delta path is provided for circulation of third and other harmonics incident to transformer excitation, and for circulation current incident to unbalanced power flow through the Y connected primary, as well as power transformation. Similarly, the zig-zag winding provides a grounded neutral point for the flow of phase to neutral current in a manner similar to that of a separate grounding transformer, as well as power transformation. It will also be noted that as the characteristics of a zig-zag connection include an inherently stable neutral, a line to neutral load or a line fault current will be divided equally between its windings.

The construction illustrated in Fig. 3 is operationally the same as that illustrated in Fig. 1 with the exception that the separate windings 13ª, 14ª and 15ª are physically eliminated, and their equivalent is obtained by tapping the delta connected secondary windings.

Referring to Fig. 3—5¹, 6¹, and 7¹ indicate primary windings having a Y connection similar to that illustrated in Fig. 1, the winding being wound on respective core elements 2¹, 3¹ and 4¹ of the core 1¹. The secondary windings 31, 32 and 33 wound on the core elements 2¹, 3¹ and 4¹ respectively, have their free ends connected in the usual delta connection, as shown for the windings 9, 11 and 12 of Fig. 1. The windings 34ᵇ, 35ᵇ and 36ᵇ wound on the core elements 2¹, 3¹ and 4¹ respectively, correspond to the windings 14ᵇ, 15ᵇ and 13ᵇ respectively, in the construction illustrated in Fig. 1. These windings each have one of their corresponding ends connected together, as indicated at 16¹, thus forming the usual Y connection for these particular windings. The opposite ends of the respective windings 34ᵇ, 35ᵇ and 36ᵇ are connected to taps 38, 39 and 37, on the windings 32, 33 and 31 respectively, so that the portions 31ª, 32ª and 33ª of the respective windings 31, 32 and 33, correspond electrically to the windings 13ª, 14ª and 15ª respectively of the circuit illustrated in Fig. 1. As the portions 31ª, 32ª and 33ª carry current from both the delta connecting winding and the zig-zag winding, thus formed, such portions will normally be constructed of a larger conductor to accommodate the combined current flowing through such portions. It will be noted that the portions 31ª, 32ª and 33ª each comprise the same number of turns of conductor as the respective windings 34ᵇ, 35ᵇ and 36$^b$, or the winding 13$^a$, 14$^a$ and 15$^a$ respectively, of Fig. 1, and as in the case of the usual zig-zag windings each of the six sections of the zig-zag windings are equal in number of turns.

It will be apparent that electrically, the construction illustrated in Fig. 3 is the same as that illustrated in Fig. 1, as the portions 31$^a$, 32$^a$ and 33$^a$ all bear the same phase relationship to the respective portions 13$^a$, 14$^a$ and 15$^a$ of the construction illustrated in Fig. 1, and the voltages are likewise the same at the points of connection between the portions 31$^a$, 32$^a$ and 33$^a$ and windings 36$^b$, 34$^b$ and 35$^b$ respectively, as at the points of connections between the windings 13$^a$, 14$^a$ and 15$^a$ and the windings 13$^b$, 14$^b$ and 15$^b$ respectively. It will be apparent that considerable latitude may be exercised with respect to the ratio of capacity between the delta portion and the zig-zag portion of the combination winding in either of the constructions illustrated in Fig. 1 or 3, whereby transformers may be designed to meet specific requirements. It will also be obvious that the total amount of copper required for the combination winding will only exceed by from 5 to 10% the amount of copper required for a conventional delta connected winding.

The construction illustrated in Fig. 5 is identical with that illustrated in Fig. 1, with the exception that the same windings illustrated in the latter, and bearing the same reference numerals, are wound on separate transformer cores 42, 43 and 44, corresponding to the core elements 2, 3 and 4, in such cases a separate transformer core and case being provided for windings of each phase.

Similarly, Fig. 6 illustrates the same windings disclosed in Fig. 3, and bearing the same reference numerals, but wound upon separate transformer cores 42$^1$, 43$^1$ and 44$^1$, corresponding to the respective core elements 2$^1$, 3$^1$ and 4$^1$ of the construction illustrated in Fig. 3. The modifications illustrated in Figs. 5 and 6, embodying separate or single phase transformer cores for each phase, may be desirable in instances where a limited size and weight of individual transformers is important, as, for example, if the transformers are to be used at a point where transportation presents a problem. The transformers illustrated in Figs. 1 and 3 may be too bulky and heavy to permit transportation thereof to the point of use, whereas the three individual units may be readily handled. It will be apparent that in general, the operation of the transformer banks, illustrated in Figs. 5 and 6 will be the same as for the single transformers illustrated in Figs. 1 and 3.

It will be noted from the above disclosure, that the present invention permits the use of a single transformer, or a single bank of transformers to achieve results not heretofore achieved with the same number of units, whereby transformer and installation costs may be reduced, at the same time providing more flexible operation.

Obviously the combination delta and zig-zag connections may be utilized on either primary, secondary, or both sides of a transformer or transformer bank and with other than a Y connected winding. The circuits herein shown and described merely being for purposes of illustration.

Similarly, while I have illustrated the invention in connection with three phase circuits which are most commonly used, the invention could be utilized in connection with other multi-phase circuits, as for example, six phase circuits.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, and including three like windings, one on each of said core elements, connected together in closed series to form a delta connected circuit, with their junctions adapted to be connected to another three phase line or system, each of the single phase windings forming said delta circuit having a tap thereon, the remainder of such windings being interconnected and respectively connected to said taps to form a zig-zag connected circuit, portions of which are in common with said delta connected circuit.

2. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, and including three like windings, one on each of said core elements, connected together in closed series to form a delta connected circuit, with their junctions adapted to be connected to another three phase line or system, the remainder of such windings being interconnected to form a zig-zag connected circuit and operatively connected to the junctures of the single phase components of said delta connected circuit, the number of turns in each of the single phase component windings forming said zig-zag circuit being equal, and one third of the number of turns in the respective single phase windings comprising the delta connected circuit.

3. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, means for operatively connecting said windings to another three phase line or system and means for interconnecting said windings to form a combination winding providing both a delta connected circuit and a zig-zag connected circuit between the respective conductors of the last mentioned line or system.

4. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, and including three like windings, one on each of said core elements, connected together in closed series to form a delta connected circuit, with their junctions adapted to be connected to another three phase line or system, each of the single phase windings forming said delta circuit having a tap thereon, the remainder of such windings being interconnected and respectively connected to said taps to form a zig-zag connected circuit, portions of which are in common with said delta connected circuit, the number of turns in each of such common portions being one third of the number of turns in the respective single phase windings comprising the delta connected circuit and equal to the number of turns in each of the other single phase windings of the zig-zag connected circuit.

5. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, and including three like windings, one on each of said core elements, connected together in closed series to form a delta connected circuit, with their junctions adapted to be connected to another three phase line or system, each of the single phase windings forming said delta circuit having a tap thereon, the remainder of such windings being interconnected and respectively connected to said taps to form a zig-zag connected circuit, portions of which are in common with said delta connected circuit, the number of turns in each of such common portions being one third of the number of turns in the respective single phase windings comprising the delta connected circuit and equal to the number of turns in each of the other single phase windings of the zig-zag connected circuit, the size of the conductors forming the respective common portions of said circuits being greater than those of the conductors forming the other portions of said circuits to accommodate the combined current through said common portions.

6. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, means for operatively connecting said windings to another three phase line or system and means for operatively interconnecting said windings to form a combination winding providing both a delta connected circuit and a zig-zag connected circuit between the respective conductors of said last mentioned line or system, the different single phase component windings forming the zig-zag connected circuit being equal to each other in number of turns and having one third the number of turns of each of the single phase component windings forming the delta connected circuit.

7. In a transformer or transformer bank for three phase operation, the combination of a plurality of core elements one for each phase, a winding for each phase, wound on said core elements, means for operatively connecting said windings to each other and to a three phase line or system, and a plurality of windings, one third of the number of such windings being wound on each core element, and including three like windings, one on each of said core elements, connected together in closed series to form a delta connected circuit, with their junctions adapted to be connected to another three phase line or system, the remainder of such windings being interconnected to form a zig-zag connected circuit and operatively connected to the junctures of the single phase components of said delta connected circuit.

8. In a transformer or transformer bank for three-phase operation, the combination of a plurality of core elements, one for each phase, a winding for each phase wound on said core elements, said windings having one of their corresponding ends connected together to form a Y connected primary circuit with the opposite end of each of said windings being adapted to be connected to a respective phase of a three-phase line or system, and a plurality of windings, one-third of the number of such windings being wound on each core element, and including three like windings, one on each of said core elements, connected together in closed series to form a delta connected circuit, with their junctions adapted to be connected to another three phase line or system, the remainder of such windings being interconnected to form a zig-zag connected circuit and operatively connected to the junctures of the single phase components of said delta connected circuit, the number of turns in each of the single phase component windings forming said zig-zag circuit being equal, and one third of the number of turns in the respective single phase windings comprising the delta connected circuit.

9. In a transformer or transformer bank for three-phase operation, the combination of a plurality of core elements, one for each phase, a winding for each phase wound on said core elements, said windings having one of their corresponding ends connected together to form a Y connected primary circuit with the opposite end of each of said windings being adapted to be connected to a respective phase of a three-phase line or system, and a plurality of windings, one third of the number of such windings being wound on each core element, means for operatively connecting said windings to another three-phase line or system, and means for interconnecting said windings to form a combination winding providing both a delta connected circuit and a zig-zag connected circuit between the respective conductors of said last-mentioned line or system.

10. In a transformer or transformer bank for three-phase operation, the combination of a plurality of core elements, one for each phase, a winding for each phase wound on said core elements, said windings having one of their corresponding ends connected together to form a Y connected primary circuit with the opposite end of each of said windings being adapted to be connected to a respective phase of a three phase line or system, and a plurality of windings, one-third of the number of such windings being wound on each core element, and including three like windings, one on each of said core elements, connected together in closed series to form a delta connected circuit, with their junctions adapted to be connected to another three-phase line or system, each of the single phase windings forming said delta circuit having a tap thereon, the remainder of such windings being interconnected and respectively connected to said taps to form a zig-zag connected circuit, portions of which are in common with said delta connected circuit, the number of turns in each of such common portions being one-third of the number of turns in the respective single phase windings comprising the delta connected circuit and equal to the number of turns in each of the other single phase windings of the zig-zag connected circuit.

11. In a transformer or transformer bank for three-phase operation, the combination of a plurality of core elements, one for each phase, a winding for each phase wound on said core elements, said windings having one of their corresponding ends connected together to form a Y connected primary circuit with the opposite end of each of said windings being adapted to be connected to a respective phase of a three-phase line or system, and a plurality of windings, one-third of the number of such windings being wound on each core element, means for operatively connecting said windings to another three-phase line or system, and means for operatively interconnecting said windings to form a combination winding providing both a delta connected circuit and a zig-zag connected circuit between the respective conductors of said last-mentioned line or system, the different single phase component windings forming the zig-zag connected circuit being equal to each other in number of turns and having one-third the number of turns of each of the single phase component windings forming the delta connected circuit.

HENRY L. HOEPPNER.

REFERENCES CITED

The following references are of record in the file of this patent:

FOREIGN PATENTS

| Number | Country | Date |
|---|---|---|
| 294,629 | Germany | Oct. 18, 1914 |